(12) United States Patent
Lawrence

(10) Patent No.: US 6,393,444 B1
(45) Date of Patent: May 21, 2002

(54) PHONETIC SPELL CHECKER

(75) Inventor: Stephen Graham Copinger Lawrence, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/265,460

(22) Filed: Mar. 10, 1999

(30) Foreign Application Priority Data

Oct. 22, 1998 (GB) ............................................ 9822997

(51) Int. Cl.[7] .............................................. G06F 17/21
(52) U.S. Cl. ...................................... 707/533; 707/532
(58) Field of Search ................................ 707/533, 532, 707/540, 530, 531

(56) References Cited

U.S. PATENT DOCUMENTS

| 5,218,536 | A | | 6/1993 | McWherter | 707/533 |
| 5,845,238 | A | * | 12/1998 | Fredenburg | 704/1 |
| 5,907,839 | A | * | 5/1999 | Roth | 707/5 |
| 6,032,164 | A | * | 2/2000 | Tsai | 707/533 |

OTHER PUBLICATIONS

Veronis, "Correction of phonographic errors in natural language interfaces", ACM, 1988, pp. 101–115.*

Peterson, "Computer programs for detecting and correcting spelling errors", Communications for the ACM, vol. 23, No. 12, Dec. 1980, pp. 676–687.*

Turba, "Checking for spelling and typographical errors in computer–based text", Proceedings of the ACM SIGPLAN SIGOA symposium on Text manipulation, Jun. 1981, pp. 51–60.*

* cited by examiner

*Primary Examiner*—Stephen Hong
(74) *Attorney, Agent, or Firm*—Paul J. Otterstedt

(57) ABSTRACT

A phonetic spell checker comprises a dictionary table (10) having a plurality of entries each including an orthography and an associated pronunciation, said pronunciation comprising one or more phonemes; and a weightings table (14) having a plurality of entries, each including a cluster comprising one or more letters, a cluster pronunciation comprising one or more phonemes and a weighting for said pronunciation of said cluster. A user interface receives a word to be checked, a clustering mechanism divides the word into a plurality of clusters, each cluster having one or more pronunciations, each pronunciation comprising one or more phonemes. Pronunciations of the word are ordered according to the associated weightings of the cluster pronunciations in the weighting table; and the dictionary is searched for an orthography whose associated pronunciation matches at least the most heavily weighted pronunciation.

20 Claims, 3 Drawing Sheets

FIG. 2

| CLUSTER | POS. | VAR. | PHONES | WEIGHTING | SAMPLE |
|---|---|---|---|---|---|
| o | 1 | 1 | oh | 241,043 | o |
| o | 1 | 2 | o | 240,692 | hot |
| o | 1 | 3 | E | 240,243 | obey |
| o | 1 | 4 | w u | 240,032 | one |
| o | 1 | 5 | u | 240,019 | oven |
| o | 1 | 6 | oo | 180,282 | do |
| o | 1 | 7 | uh | 180,158 | yod |
| o | 1 | 8 | i | 180,007 | women |
| o | 1 | 9 | h oh | 61,043 | NONE-h |
| o | 2 | 1 | o | 251,136 | hot |
| o | 2 | 2 | oh | 248,656 | o |
| o | 2 | 3 | E | 247,838 | aeon |
| o | 2 | 4 | u | 240,816 | dos |
| o | 2 | 5 | oo | 240,256 | do |
| o | 2 | 6 | uh | 240,154 | yod |
| o | 2 | 7 | 0 | 240,095 | iron |
| o | 2 | 8 | w u | 240,039 | one |
| o | 2 | 9 | i | 240,007 | women |
| o | 2 | 10 | h o | 71,136 | NONE-h |
| o | 3 | 1 | oh | 240,496 | bo |
| o | 3 | 2 | oo | 240,026 | do |
| o | 3 | 3 | uh | 240,004 | onto |
| o | 3 | 4 | E | 240,001 | greensboro |
| o | 3 | 5 | o | 191,828 | hot |
| o | 3 | 6 | u | 180,835 | dos |
| o | 3 | 7 | w u | 180,071 | one |
| o | 3 | 8 | i | 180,007 | women |
| w | 1 | 1 | w | 242,202 | win |
| w | 1 | 2 | 0 | 240,167 | wry |
| w | 1 | 3 | v | 240,006 | weber |
| w | 2 | 1 | w | 243,904 | win |
| w | 2 | 2 | 0 | 240,314 | two |
| w | 2 | 3 | v | 240,008 | weber |
| z | 1 | 1 | z | 240,208 | zoo |
| z | 1 | 2 | t s | 240,008 | zeppelin |
| z | 1 | 4 | s | 180,104 | oyez |
| z | 1 | 5 | zh | 180,011 | azure |
| z | 1 | 7 | sh | 60,011 | NONE-v |
| z | 2 | 1 | z | 243,149 | zoo |
| z | 2 | 2 | s | 240,087 | oyez |
| z | 2 | 3 | t s | 240,065 | nazi |
| z | 2 | 4 | zh | 240,011 | azure |
| z | 2 | 6 | 0 | 240,002 | pince-nex |
| z | 2 | 7 | sh | 60,011 | NONE-v |
| z | 3 | 1 | z | 240,020 | zoo |
| z | 3 | 2 | s | 240,017 | oyez |
| z | 3 | 3 | t s | 240,002 | mainz |
| z | 3 | 5 | 0 | 240,001 | pince-nex |
| z | 3 | 6 | zh | 180,011 | azure |

FIG. 3

| ENTRY | CLUSTER | POS. | VAR. | PHONES | WEIGHTING | SAMPLE |
|---|---|---|---|---|---|---|
| 1 | o | 2 | 1 | o | 251,136 | hot |
| 2 | o | 2 | 2 | oh | 248,656 | o |
| 3 | o | 2 | 3 | E | 247,838 | aeon |
| 4 | w | 1 | 1 | w | 242,202 | win |
| 5 | o | 2 | 4 | u | 240,816 | dos |
| 6 | o | 2 | 5 | oo | 240,256 | do |
| 7 | w | 1 | 2 | 0 | 240,167 | wry |
| 8 | o | 2 | 6 | uh | 240,154 | yod |
| 9 | o | 2 | 7 | 0 | 240,095 | iron |
| 10 | o | 2 | 8 | w u | 240,039 | one |
| 11 | z | 3 | 1 | z | 240,020 | zoo |
| 12 | z | 3 | 2 | s | 240,017 | oyez |
| 13 | o | 2 | 9 | i | 240,007 | women |
| 14 | w | 1 | 3 | v | 240,006 | weber |
| 15 | z | 3 | 3 | t s | 240,002 | mainz |
| 16 | z | 3 | 5 | 0 | 240,001 | pince-nez |
| 17 | z | 3 | 6 | zh | 180,011 | azure |
| 18 | o | 2 | 10 | h o | 71,136 | NONE-h |

PHONETIC SPELL CHECKER

FIELD OF THE INVENTION

The present invention relates to a phonetic spell checker.

BACKGROUND OF THE INVENTION

The objective of a phonetically-based spell-checker is to list the most likely correct spellings from a phonetic spelling of a word. For example the word "woz" could be correctly spelt "woos", "woes", "whiz" or "was".

DISCLOSURE OF THE INVENTION

The present invention provides a phonetic spell checker as claimed in claim 1.

In a further aspect the invention provides a data collection component for generating a weightings table for a phonetic spell checker according to claim 5.

BRIEF DESCRIPTION OF THE DRAWINGS

An embodiment of the invention will now be described with reference to the accompanying drawings, in which:

FIG. 2 is an extract from the weightings table of FIG. 1; and

FIG. 3 shows a searching order for a word, generated by the spell checker of FIG. 1.

DESCRIPTION OF THE PREFERRED EMBODIMENTS

Figure 1:
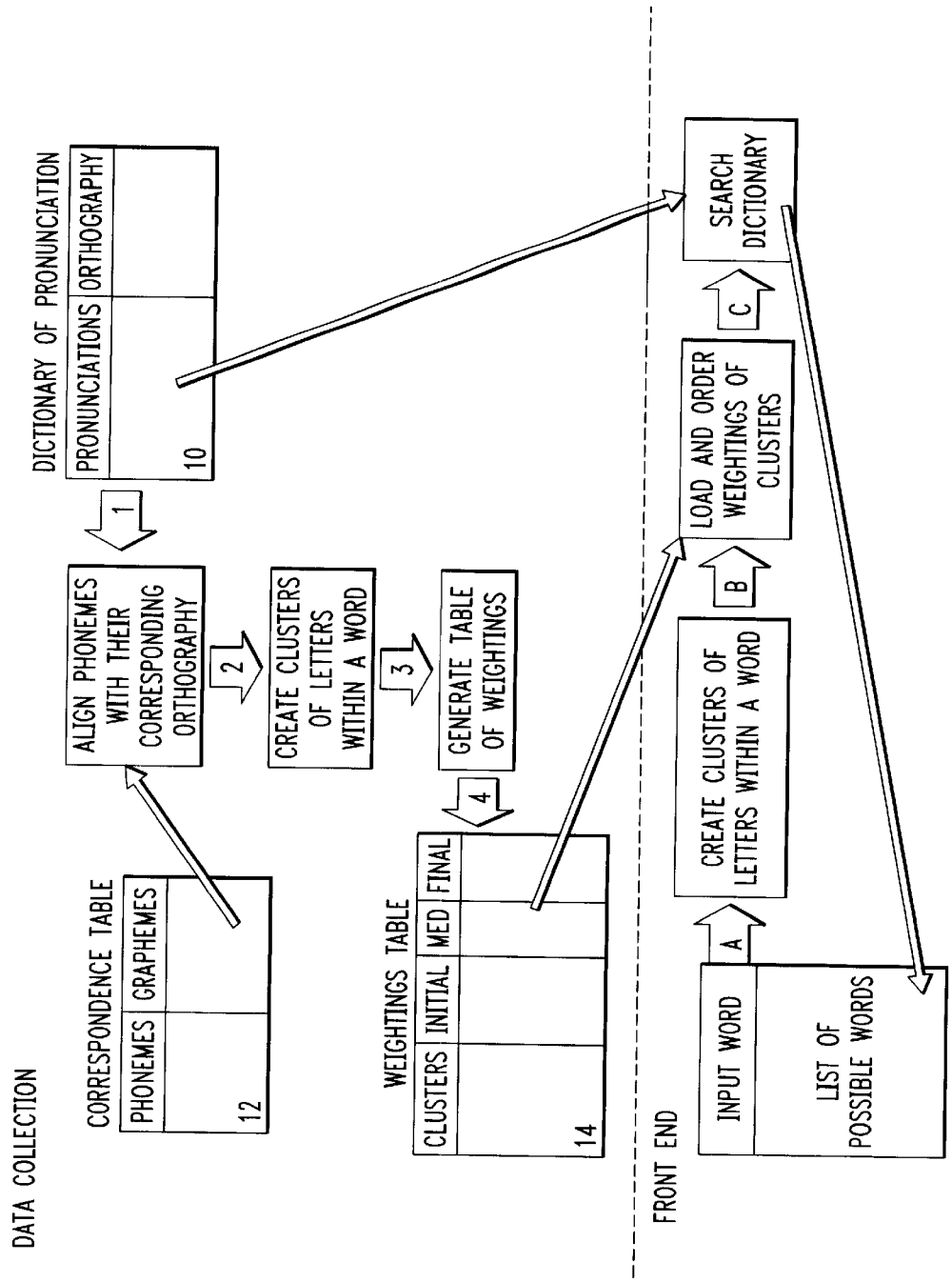
FIG. 1 is a schematic diagram of a phonetic spell checker according to the invention.

The present invention operates by using a table of weightings, FIG. 2, which contain the frequencies of spelling occurrences of the sounds that correspond to the letters in a word. The information contained in the table enables the spell checker to decide, for example, that the most likely correct spelling of "woz" is "was".

The phonetically-based spell-checker has been implemented in two parts; a data collection process which generates the table of weightings and a spelling generation process which uses the weightings table to produce a list of possible spellings.

Data Collection

1. Align Phonemes with their Corresponding Orthography

Referring now to FIG. 1, a dictionary of pronunciation 10 comprises a list of words each with a respective orthography and pronunciation key. The pronunciation key comprises one or more phonemes for a word. In a first stage, the dictionary is read and each word's orthography is aligned with the corresponding phonemes as described in "Alignment of phonemes with their corresponding orthography" (Computer Speech and Language (1986)) using a table 12 containing clusters of letters (graphemes) and the sounds used when speaking the letters (phonemes). The table 12 is constructed so that only strings of letters corresponding to single phonemes are held in the table, thus there is an entry for the string "augh" as it can be pronounced as the single phoneme that sounds like "or" as in the word "daughter". It should be noted that some strings of letters may be silent and so are represented by a silent phoneme in the table 12.

2. Create Clusters of Letters Within a Word

Each word in the dictionary is split into clusters of letters using the data contained in the correspondence table 12. All geminate consonant letters in a word are converted into single letters, thus the word "letter" is converted to "leter".

A word is scanned from left to right and a table look up is performed to find the longest string of letters that has an entry in the correspondence table. There are a number of exceptions to this method, for example, in the word "being", the "e" is separated from the "ing" despite the fact that there are instances of "ei" in the correspondence table. Another exception is where three vowels appear together. The following vowel groupings are split so that the first vowel forms a cluster and the last two vowels form a cluster—aoi, eoi, iao, iai, iau, ioi, oau, uia, uau and uou.

A more general example of clustering, however, is the word "laugh". This is successively tested to determine if a grapheme exists in the table for "laugh", "laug", "lau", "la", and finally "l". A grapheme exists for "l" only and the entry for this pronunciation in the weightings table is incremented. "augh" is now tested and a grapheme represented by a single phoneme exists in the correspondence table, and so the entry for "laugh" is incremented in the weightings table. Thus, laugh is broken into two clusters "l" and "augh".

3. Generate Table of Weightings

Having split the word into clusters the sounds for each of the clusters are assigned and a count of the correspondence is saved in preparing the weightings table 14. The position of the cluster is also noted. There are three notable positions for the cluster; initial, medial and final. Thus, taking the grapheme "l", its number of occurrences in the dictionary at the start of a word where it is associated with a given phoneme is counted and recorded in the weightings table, and similarly for each pronunciation of "l" where it appears in medial and final clusters. The more often a grapheme is pronounced as a given phoneme, the heavier its weighting will be.

FIG. 2 shows data for w, o and z clusters. In the figure, the following conventions have been observed.

Pos. is the position of the cluster within a word; 1=Initial, 2=Medial, 3=Final.

Var. is the number of the variant pronunciation for the cluster.

E in the phones column is used to represent the reduced vowel, schwa.

NONE-v in the sample column indicates that there are no samples but the variant has been generated by changing a phoneme from a voiced phoneme to the corresponding unvoiced phoneme or vice versa.

NONE-h in the sample column indicates that there are no samples but the variant has been generated by adding an aitch to the beginning of a phonemic vowel cluster.

We can see that the grapheme "o" has 9 different pronunciations (phonemes) when in an initial position, the most common of these being "oh" as in "o". Its most common pronunciation when in medial and final positions are "o" as in "hot", and "oh" as in "bo" respectively.

If the last phoneme for a cluster is a phonemic "r" it is converted into "*". The "*" will be converted back to a phonemic "r" if the phoneme to the right, during the spelling generation process described later, is a vowel or else the "*" will be deleted. This is known as a "linking-r". Clusters may be silent and again these are noted.

When the complete dictionary has been read, the weightings table is modified to add more cluster sounds even though they do not occur in the dictionary as ways in which a cluster can be pronounced. All additions have reduced weightings from those that occur in the dictionary. The following modifications are made:

Clusters not appearing in all of the initial, medial or final positions are added to the list of clusters for those positions.

Voiced sounds are generated for unvoiced sounds and vice versa. For example phonemic "g" will be converted to phonemic "k" and vice versa.

If a correspondence of schwa and an orthographic cluster beginning with a vowel does not exist then one is added.

To handle dropped aitches, clusters beginning with phonemic "h" are generated where one does not exist for orthographic clusters that begin with a vowel.

It will be seen that by taking the occurrence of pronunciations from a dictionary, the data collection process weights pronunciations from words which are not commonly used, say "zygote". Thus, in an alternative embodiment, the text of an on-line book (corpus) is used as a word source rather than the dictionary. As each word of the book is checked, its pronunciation is taken from the dictionary as before and the entries for the clusters in the word are incremented in the weightings table accordingly. This of course has the disadvantage that the cluster pronunciations for "the" and other commonly used words will be heavily weighted and this may also skew results. It will be seen therefore that combinations of sources can be used until a balance is found.

Spelling Generation

A. Create Clusters of Letters within a Word

The end user enters a word to be spell-checked through a front-end user interface. The word is split into clusters of letters using the same clustering method as described above in the data collection process.

B. Load and Order Weightings of Clusters

The phonetic variants for each of the clusters is extracted from the weightings table and sorted into descending weighting order. A sample of the sorted weightings is shown in FIG. 3. It contains data for the input "woz". Note that the variants are those pertaining to the position of the cluster within the word, "w" is initial, "o" is medial, and "z" is final. The most likely pronunciation of "woz" will be the most common pronunciation of "w" in an initial position, "o" in a medial position" and "z" in a final position. The next combination to be searched will be using the second most common pronunciation of "o" in the medial position, as the second most common pronunciations of "we" and "z" in their respective positions are not as common. The ordering continues until the system arrives at the least common pronunciation of the three clusters in their respective positions.

C. Search Dictionary

In the sorted extract from the sample weightings table there are 3 variant pronunciations of "w", 10 variant pronunciations for "o", and 5 for "z". There are 150 possible pronunciations for "woz". This is a simple example. The complete weightings table contains a possible 700 pronunciations for "woz". The problem to solve is how to check the validity of pronunciations so that the most likely ones are presented as the first in the list of words and the least likely last, without generating all possible pronunciations.

Using the sorted weightings table the most likely pronunciation is constructed by using the first phonemic variant for each cluster. For "woz" this is "w o z". A search of the dictionary, using the pronunciation as the key, finds that the orthography pronounced "w o z" is "was". This spelling is saved in the list of possible words presented to the end user.

The sorted extract of the weightings table is used to find the next most likely pronunciation. The second entry contains "oh" for the second cluster. The pronunciation of "w oh z" is spelt "woes". The third entry contains "E" (schwa). There is no entry in the dictionary for the pronunciation Mew E zoo.

When the seventh entry in the table is reached it contains the second phonemic variant for "w". It is silence, represented by a zero. A check is made to see if a silent cluster can occur in between the phonemes to the left and the phonemes to the right. The collection of data relating to silent clusters is collected during the data collection process. "w" cannot be silent in this position so the entry in the table is ignored.

When the twelfth entry is reached it contains the second phonemic variant for "z". The spelling generator constructs a possible pronunciation using entry 4 for "w", entry 1 for "o" and entry 12 for "z" thus creating "w o s". There is no entry in the dictionary for "w o s". The next entries are generated by using "s" for z and all the entries up to entry 12.

When entry 14 is reached it contains the third phonemic variant for "w". The spelling generator uses "v" for the pronunciation of "w" and then uses each variant for the second and third clusters in the order they appear in the table.

The above describes how the possible spellings are searched for in the dictionary such that the spellings from the pronunciations with the greatest (heavier) weightings are selected before those with lesser (lighter) weightings.

It will be seen that the spell checker according to the invention may be implemented within a computer system in any number of ways. It can operate as a stand alone program with a user inputting a single word through an entry field, and obtaining a list of pronunciations in order of probability within a scroll bar. The invention can be incorporated into a spell checker which allows a user either to phonetically check a word in text, or to input a word for checking or the invention could even have a front end operating as an applet operable within a browser, with a dictionary being centrally located on a server connected to the browser across the Internet. The techniques disclosed here may also be useful in any language understanding or processing facility where perhaps text to speech conversion or vice versa is being carried out.

It should be noted, however, why the phonetic spell checker may not be useful for checking entire relatively accurately spelled documents. Take for example, when a user inputs the word "laugh". As explained above, this is broken into two clusters "l" and "augh". The heaviest weighting for "augh" in a final position is "or" and so the spell checker will match with the word "la" which is associated with "l" and "or" phonemes in the dictionary. "law" and "lore" are also associated with "l" and "or" phonemes and these will be displayed as the next most likely candidates. In fact "laugh" would only follow "lac" and "lark" as a candidate.

However, when a user inputs the phonetic spelling "laf", the checker picks up "laugh", which is in fact associated with "l", "ar" and "f" phonemes in the dictionary, as the most likely spelling. Similarly, the checker should pick up "psychological" as a candidate for "sikkelojikel", whereas checking if "psychological" is correctly spelled with the spell checker according to the invention would be very processor intensive.

What is claimed is:

1. Apparatus for performing phonetic spell checking, the apparatus comprising:

a dictionary table including a plurality of entries, each entry including an orthography and an associated pronunciation, and each pronunciation including one or more phonemes;

a weightings table including a plurality of entries, each entry including a cluster which includes one or more letters, a cluster pronunciation including one or more phonemes, and a weighting for the pronunciation of the cluster; and at least one processor operable to divide a received word into a plurality of clusters, each cluster including one or more pronunciations and each pronunciation including one or more phonemes, to rank the pronunciations of the word according to the associated weightings of the cluster pronunciations in the weightings table, and to search the dictionary table for an orthography whose associated pronunciation matches at least the most heavily weighted pronunciation.

2. The apparatus of claim 1, wherein a source of the received word is a dictionary.

3. The apparatus of claim 1, wherein a source of the received word is a book.

4. The apparatus of claim 1, wherein the weightings table includes a respective entry for a cluster pronunciation for an initial position, a medical position and a final position in a word.

5. The apparatus of claim 1, wherein the at least one processor is further operable to rank the pronunciation of the word according to position of each cluster.

6. Apparatus for generating a phonetic spell checker, the apparatus comprising:

at least one processor operable to form a weightings table in conjunction with a dictionary table, the weightings table including a plurality of entries such that each entry includes a cluster which includes one or more letters, a cluster pronunciation including one or more phonemes, and a weighting for the pronunciation of the cluster, the dictionary table including a plurality of entries such that each entry includes an orthography and an associated pronunciation including one or more phonemes;

wherein the at least one processor is also operable to align the orthography of each dictionary table entry with its corresponding phonemes, to generate a correspondence table including a plurality of entries such that each entry includes a cluster having one or more letters associated with a phoneme, to divide each word associated with a word source into a plurality of clusters, each cluster corresponding to a cluster in the correspondence table, to count each occurrence of a cluster pronunciation in the word source, and to increment an entry in the weightings table according to the cluster pronunciation in the word source.

7. The apparatus of claim 6, wherein the weightings table includes a respective entry for a cluster pronunciation for an initial position, a medial position and a final position in a word.

8. The apparatus of claim 6, wherein the at least one processor is further operable to rank the pronunciation of the word according to position of each cluster in a word.

9. The apparatus of claim 6, wherein the at least one processor is further operable to successively scan a word from right to left and to search the correspondence table to find the longest string of letters that has an entry in the correspondence table.

10. A method of performing phonetic spell checking, the method comprising the steps of:

accessing a dictionary table and a weightings table, wherein the dictionary table includes a plurality of entries, each entry including an orthography and an associated pronunciation, and each pronunciation including one or more phonemes, further wherein the weightings table includes a plurality of entries, each entry including a cluster which includes one or more letters, a cluster pronunciation including one or more phonemes, and a weighting for the pronunciation of the cluster;

dividing a received word into a plurality of clusters, each cluster including one or more pronunciations and each pronunciation including one or more phonemes;

ranking the pronunciations of the word according to the associated weightings of the cluster pronunciations in the weightings table; and searching the dictionary table for an orthography whose associated pronunciation matches at least the most heavily weighted pronunciation.

11. The method of claim 10, wherein a source of the received word is a dictionary.

12. The method of claim 10, wherein a source of the received word is a book.

13. The method of claim 10, wherein the weightings table includes a respective entry for a cluster pronunciation for an initial position, a medial position and a final position in a word.

14. The method of claim 13, further including the step of ranking the pronunciation of the word according to position of each cluster in a word.

15. A method of generating a phonetic spell checker, the method apparatus comprising:

forming a weightings table in conjunction with a dictionary table, the weightings table including a plurality of entries such that each entry includes a cluster which includes one or more letters, a cluster pronunciation including one or more phonemes, and a weighting for the pronunciation of the cluster, the dictionary table including a plurality of entries such that each entry includes an orthography and an associated pronunciation including one or more phonemes;

aligning the orthography of each dictionary table entry with its corresponding phonemes;

generating a correspondence table including a plurality of entries such that each entry includes a cluster having one or more letters associated with a phoneme;

dividing each word associated with a word source into a plurality of clusters, each cluster corresponding to a cluster in the correspondence table;

counting each occurrence of a cluster pronunciation in the word source; and incrementing an entry in the weightings table according to the cluster pronunciation in the word source.

16. The method of claim 15, wherein the weightings table includes a respective entry for a cluster pronunciation for an initial position, a medial position and a final position in a word.

17. The method of claim 15, further including the step of ranking the pronunciation of the word according to position of each cluster in a word.

18. The method of claim 15, further including the step of successively scanning a word from right to left and searching the correspondence table to find the longest string of letters that has an entry in the correspondence table.

19. An article of manufacture for performing phonetic spell checking comprising a machine readable medium containing one or more programs which when executed implement the steps of:

accessing a dictionary table and a weightings table, wherein the dictionary table includes a plurality of entries, each entry including an orthography and an associated pronunciation, and each pronunciation including one or more phonemes, further wherein the weightings table includes a plurality of entries, each entry including a cluster which includes one or more letters, a cluster pronunciation including one or more phonemes, and a weighting for the pronunciation of the cluster;

dividing a received word into a plurality of clusters, each cluster including one or more pronunciations and each pronunciation including one or more phonemes;

ranking the pronunciations of the word according to the associated weightings of the cluster pronunciations in the weightings table; and searching the dictionary table for an orthography whose associated pronunciation matches at least the most heavily weighted pronunciation.

20. An article of manufacture for generating a phonetic spell checker comprising a machine readable medium containing one or more programs which when executed implement the steps of:

forming a weightings table in conjunction with a dictionary table, the weightings table including a plurality of entries such that each entry includes a cluster which includes one or more letters, a cluster pronunciation including one or more phonemes, and a weighting for the pronunciation of the cluster, the dictionary table including a plurality of entries such that each entry includes an orthography and an associated pronunciation including one or more phonemes;

aligning the orthography of each dictionary table entry with its corresponding phonemes;

generating a correspondence table including a plurality of entries such that each entry includes a cluster having one or more letters associated with a phoneme;

dividing each word associated with a word source into a plurality of clusters, each cluster corresponding to a cluster in the correspondence table;

counting each occurrence of a cluster pronunciation in the word source; and incrementing an entry in the weightings table according to the cluster pronunciation in the word source.

\* \* \* \* \*

UNITED STATES PATENT AND TRADEMARK OFFICE
CERTIFICATE OF CORRECTION

PATENT NO.   : 6,393,444 B1
DATED        : May 21, 2002
INVENTOR(S)  : Stephen Graham Copinger Lawerence It is certified that error appears in the above-identified patent and that said Letters Patent is hereby corrected as shown below:

Title page,
Item [54], change the title from "PHONETIC SPELL CHECKER" to -- PHONETIC SPELL CHECKER FOR LISTING MOST LIKELY CORRECT SPELLINGS FROM A PHONETIC SPELLING OF A WORD --.

Column 1,
Line 19, please change "5" to -- 6 --.

Column 4,
Line 23, after "cluster," please insert -- in a word --.

Column 5,
Line 19, please change "medical" to -- medial --.

Column 6,
Line 26, after "method" delete "apparatus".

Signed and Sealed this

Twelfth Day of November, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

PATENT NO. : 6,393,444 B1
DATED : May 21, 2002
INVENTOR(S) : Stephen Graham Copinger Lawerence It is certified that error appears in the above-identified patent and that said Letters Patent is hereby corrected as shown below:

Title page,
Item [54], change the title from "PHONETIC SPELL CHECKER" to -- PHONETIC SPELL CHECKER FOR LISTING MOST LIKELY CORRECT SPELLINGS FROM A PHONETIC SPELLING OF A WORD --.

Column 1,
Line 19, please change "5" to -- 6 --.

Column 5,
Line 23, after "cluster," please insert -- in a word --.
Line 19, please change "medical" to -- medial --.

Column 6,
Line 26, after "method" delete "apparatus".

This certificate supersedes Certificate of Correction issued November 12, 2002.

Signed and Sealed this

Eleventh Day of February, 2003

JAMES E. ROGAN
*Director of the United States Patent and Trademark Office*